UNITED STATES PATENT OFFICE.

AUGUST BLANK AND WLADIMIR RODIONOW, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

REDDISH-BROWN COTTON DYE.

951,049. Specification of Letters Patent. Patented Mar. 1, 1910.

No Drawing. Application filed October 14, 1909. Serial No. 522,619.

*To all whom it may concern:*

Be it known that we, AUGUST BLANK and WLADIMIR RODIONOW, chemists, citizens of, respectively, Germany and Russia, residing at Leverkusen, near Cologne, Germany, have invented new and useful Improvements in Reddish-Brown Cotton Dyes, of which the following is a specification.

This application relates to the manufacture and production of a specific new dyestuff which can be obtained by treating direct yellow with para-sulfanilic acid-azo-1-naphthylamin while in another application we describe the whole class to which this specific dye belongs.

Example: Direct yellow (azoazoxydistilbene disulfonic acid) (sodium salt) obtained by treating 70 parts by weight of para-nitro-toluene sulfonic acid with caustic soda lye and 28.5 parts of para-sulfanilic-acid-azo-1-naphthylamin are stirred up with 1000 parts of water and 50 parts of a 30 per cent. caustic soda lye to a thin paste. The resulting mixture is then heated to boiling for about 20 hours in a vessel provided with a reflux condenser and a stirrer. The solution is neutralized with mineral acid and the dyestuff is precipitated with salt. It is after being dried and pulverized a yellowish-brown powder which is soluble in water with a brown color, and which is soluble in concentrated sulfuric acid with a violet color being precipitated in the shape of brown flakes by the addition of water. It dyes unmordanted cotton reddish-brown shades fast to chlorin and to light.

We claim:

The herein described new dyestuff obtainable by condensing direct yellow with para-sulfanilic-acid-azo-1-naphthylamin, which dyestuff is after being dried and pulverized a yellowish-brown powder, which is soluble in water with a brown color, soluble in concentrated sulfuric acid with a violet color, being precipitated in the shape of brown flakes from such a solution by addition of water; and dyeing unmordanted cotton reddish-brown shades, substantially as described.

In testimony whereof we have hereunto set our hands in the presence of two subscribing witnesses.

AUGUST BLANK. [L. S.]
WLADIMIR RODIONOW. [L. S.]

Witnesses:
OTTO KÖNIG,
CHAS. J. WRIGHT.